United States Patent [19]

Harada

[11] Patent Number: 4,651,854

[45] Date of Patent: Mar. 24, 1987

[54] SPRING COUPLER BRAKE

[75] Inventor: Kuniyoshi Harada, Takahama, Japan

[73] Assignee: Aisin Seiki Kabushiki Kaisha, Japan

[21] Appl. No.: 491,188

[22] Filed: May 3, 1983

[30] Foreign Application Priority Data

May 4, 1982 [JP] Japan .............................. 57-075031

[51] Int. Cl.[4] .................. F16D 51/04; F16D 65/14
[52] U.S. Cl. .................................. 192/8 C; 192/12 BA
[58] Field of Search ............... 192/8 C, 12 BA, 17 D

[56] References Cited

U.S. PATENT DOCUMENTS

| 1,770,449 | 7/1930 | Ackerman et al. | 192/8 C |
|---|---|---|---|
| 1,833,615 | 11/1931 | Myers | 192/8 C |
| 1,867,643 | 7/1932 | Ackerman et al. | 192/8 C |
| 1,874,215 | 8/1932 | Ackerman et al. | 192/8 C |
| 1,997,646 | 4/1935 | Miller | 192/8 C |
| 2,075,567 | 3/1937 | Benedek | 192/8 C X |
| 2,145,666 | 1/1939 | Roethal | 192/8 C |
| 2,285,027 | 6/1942 | Gates | 192/8 C |
| 2,372,693 | 4/1945 | Swift, Jr. | 192/8 C |
| 2,457,241 | 12/1948 | Klein | 192/12 BA X |
| 3,235,248 | 2/1966 | Golde | 192/8 C X |
| 3,280,509 | 10/1966 | Werner | 192/8 C X |
| 3,726,370 | 4/1973 | Hubbard, Jr. | 192/8 C |
| 3,734,253 | 5/1973 | Derossi | 192/8 C |
| 3,796,292 | 3/1974 | Harrison | 192/8 C |
| 3,912,215 | 10/1975 | Reinmoller et al. | 248/421 |
| 4,113,308 | 9/1978 | Werner et al. | 297/362 |
| 4,246,991 | 1/1981 | Oldakowski | 192/8 C |

Primary Examiner—Rodney H. Bonck

Attorney, Agent, or Firm—Finnegan, Henderson, Farabow, Garrett & Dunner

[57] ABSTRACT

A spring coupler including a drive member, a driven member, a pair of coil springs interconnecting the drive and driven members, and a cylindrical housing providing a unidirectional drive either clockwise or counter-clockwise. The drive member has a pair of recesses in its outer surface and the driven member has a pair of substantially complementary projections, the projections and recesses interacting upon the assembly of the members to form a substantially cylindrical surface. The coil springs are coiled serially about the assembled members and the outer surfaces of the springs are frictionally engaged with the inner surface of the housing in the relaxed condition of the springs. Tangs on one end of each of the springs are inserted into individual ones of clearances between the projections and an edge of the recesses and the tangs on the other ends of the springs are inserted into slots in the projections. When the drive member is turned clockwise or counter-clockwise an edge of one of the recesses engages one of the tangs to tighten its spring and break the frictional engagement with the housing. The interaction of the other tang of the tightened spring with the slot in the projection in the other recess causes the inserted tang of the other spring to tighten its spring so as to release the frictional engagement of both springs to allow rotation of the drive and driven members. On the other hand, any counterrotations of the driven member leaves one spring in frictional engagement with the housing.

2 Claims, 5 Drawing Figures

SPRING COUPLER BRAKE

BACKGROUND OF THE INVENTION

1. Field of the Invention

The present invention relates to a one-way spring coupler through which rotation is transmitted from a drive member to a driven member but rotation is not reversibly transmitted.

2. Description of the Prior Art

FIG. 1 and FIG. 2 show a conventional spring coupler 10. The spring coupler 10 comprises a base member 14, a drive member 11 and a driven member 12 rotatably disposed in the base member 14, and a spring member 13 mounted in the base member.

The drive member 11 has a recessed portion 11a and the driven member 12 has a projecting portion 12a. The projecting portion 12a is engaged with the recessed portion 11a through predetermined clearances 15a, 15b so that the drive member 11 and the driven member 12 can be rotated as a whole. The spring member 13 is frictionally connected to the inner surface of cylindrical sidewall 14a of the base member 14. Both end portions 13a, 13b of the spring member 13 are bent inwardly so to form tangs respectively engageable in the clearances 15a, 15b with edge portions 11b, 11c of the recessed portion 11a of the drive member 11.

Thus, in FIG. 2, in case the drive member 11 is rotated in the clockwise direction, the edge portion 11c is engaged with the tang 13b of the spring member 13. In case drive member 11 is rotated in the counter-clockwise direction, the edge portion 11b is engaged with the tang 13a of the spring 13. In each case, by rotating the drive member 11 the spring member 13 is tightened about the drive member 11 so that the spring member is released from frictional contact with the inner surface of sidewall 14a and the frictional connection there between is canceled. After the frictional contact is released, the recessed portion 11a of the drive member 11 abuts against the projecting portion 12a of the driven member 12 through the tang 13a or 13b of the spring member 13, in accordance with the direction of rotation of the drive member 11, and the driven member is rotated by the drive member.

On the contrary, in case driven member 12 is rotated in the clockwise or counter-clockwise direction, the projecting portion 12a of the driven member 12 abuts against one of the tangs 13a, 13b of the spring member 13. By the rotation of the driven member 12, the spring member is expanded so that the spring member 13 is more frictionally connected to the inner surface of the sidewall 14a and the frictional connection between the spring member and the inner surface of the sidewall 14a is securely maintained. Thus, the counterrotation of the drive 11 member by the driven member 12 is obstructed. The rotation of the driven member 12 is not transmitted to the drive member 11 and the driven member 12 is maintained at a predetermined position.

However, in the conventional spring coupler 10, a certain amount of clearance 15a, 15b between the recessed portion 11a and the projecting portion 12a is required. If clearance 15a, 15b is not enough, the recessed portion 11a of the drive member 11 immediately abuts against the projecting portion 12a with the rotation of the drive member 11 and the driven member 12 is rotated without proper tightening of the spring member 13. Since the counterrotation of the driven member 12 must expand the diameter of the spring member 13 to maintain the drive member 11 against counterrotation, the driven member will act on the drive member through a tang of the spring 13 and counterrotate the drive member.

On the other hand, if the clearances 15a, 15b are too large, there will not be sufficiently positive action between the drive member 11 and the driven member 12 and there will be a tendency toward oscillation of the drive member 11 and driven member 12 with respect to each other.

SUMMARY OF THE INVENTION

It is, accordingly, an object of this invention to eliminate the above-mentioned disadvantages of the conventional spring coupler.

According to the present invention, a spring coupler is comprised of a base member, a drive member rotatably mounted in the base member, a driven member engageable with the drive member through a predetermined clearance so as to rotate positively with the drive member, first and second spring members frictionally engaged with the base member and connected to the driven member, the first spring member being engageable with the drive member so as to be releasable from the base member when the drive member is rotated in one direction, and the second spring member being engageable with the drive member so as to be releasable from the base member when the drive member is rotated in the other direction.

Therefore, when the drive member is rotated in one direction, the first spring member is engaged with the drive member and released from the base member. Further, with the rotation of the drive member, the driven member is engaged with the drive member and rotated in the same direction by the drive member. As the second spring member, which is connected to the driven member, is also released from the base member, the driven member becomes rotatable in the same direction. So, the rotation of the drive member in one direction is transmitted to the driven member.

When the drive member is rotated in the other direction, the second spring member is engaged with the drive member and released from the base member. Further, with the rotation of the drive member, the driven member is engaged with the drive member and rotated in the other direction by the drive member. As the spring member, which is connected to the driven member is also released from the base member, the driven member becomes rotatable in the other direction. So, the rotation of the drive member in the other direction is transmitted to the driven member.

On the contrary, if the driven member is counterrotated, one of the spring members, which is connected to the driven member, is released from the base member, but the other spring member is more frictionally connected to the base member. Thus, the driven member does not rotate even though the driven member attempts to be rotated. So, in spite of the fact that the driven member is engageable with the drive member through a predetermined clearance, the driven member does not oscillate between the clearances.

The spring coupler of the invention therefore permits some tolerances in the clearances between the drive and driven members while achieving absolute precision in its action.

BRIEF DESCRIPTION OF THE DRAWINGS

Various other features, objects and attendant advantages of the present invention will be more fully appreciated as the invention becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
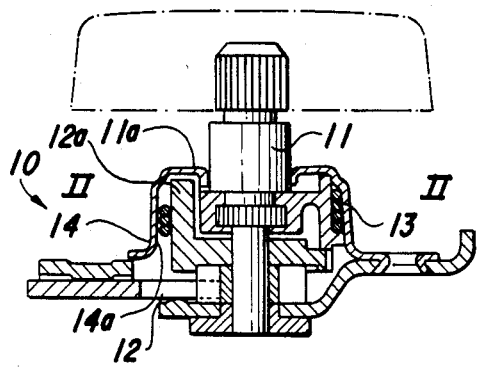
FIG. 1 is a sectional view showing a conventional spring coupler.
Figure 4:
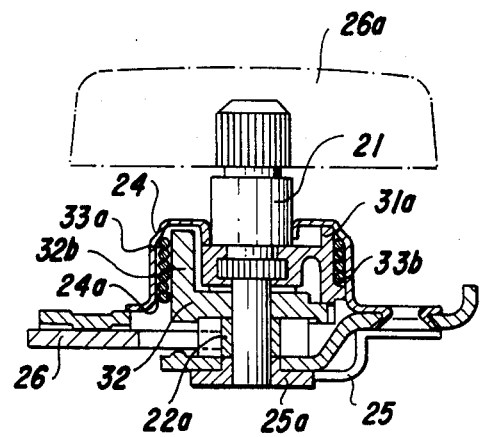
FIG. 4 is a sectional view of the assembled spring coupler shown in FIG. 3.
Figure 2:
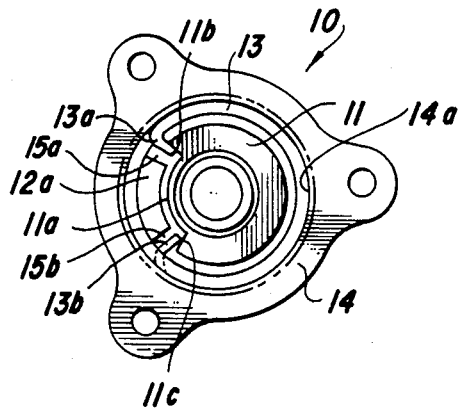
FIG. 2 is a plan view of the conventional coupler of FIG. 1.
Figure 5:
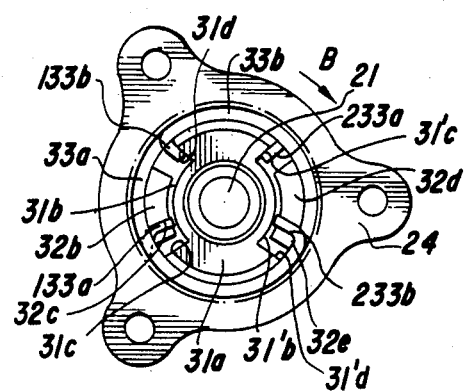
FIG. 5 is a plan view of the assembled spring coupler shown in FIG. 3.
Figure 3:
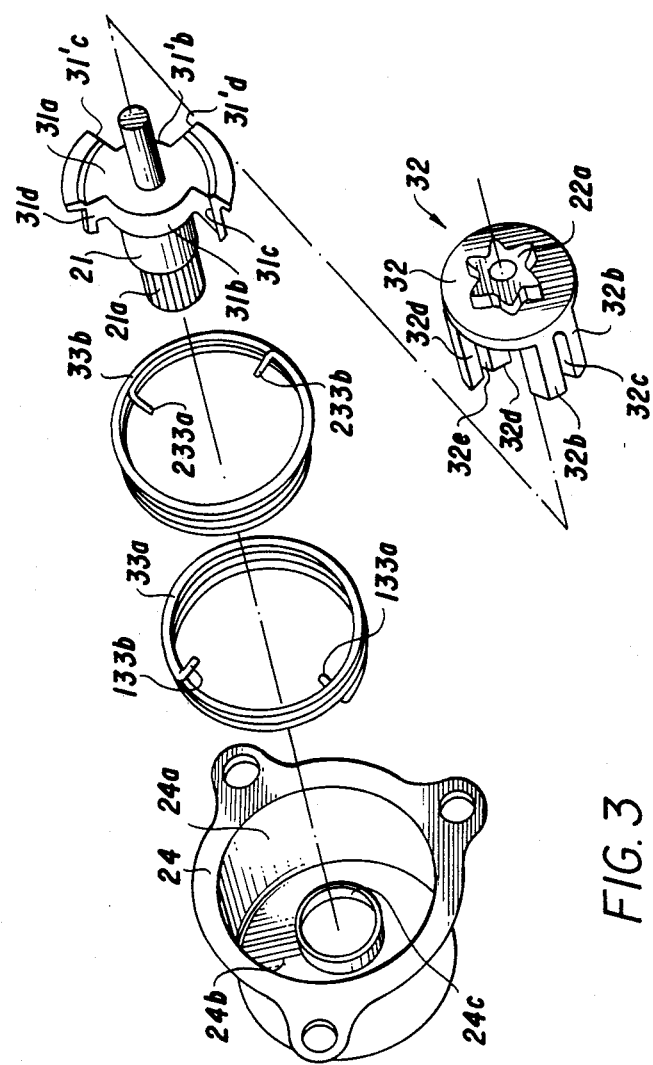
FIG. 3 is an exploded perspective view of a spring coupler according to the present invention.

Referring now to FIGS. 3, 4 and 5, a cylindrical case or base member 24 has a partially closed end 24b with a base plate 25 secured to the opposite open end of the case. A drive member 21 has a handle shaft 21a rotatably disposed in an aperture 24c in the partially closed end 24b of the case 24. A serrated portion of the handle shaft 21a extends outwardly from the aperture 24c for having a handle 26a fitted thereon. Further, the drive member 21 has on the end opposite the handle portion 21a a coaxial core portion 31a of larger diameter than the handle portion and having first and second recesses 31b, 31b' extending along opposite sides of the shaft 21.

A driven member 32 including plate 32a with a pinion gear 22a on a face thereof is rotatably supported on an extension of the handle shaft 21a extending through the core portion 31a for engagement with a gear member 25a. A pivotable member 26 may be engaged with the pinion gear 22a as known in the art.

Further, first and second projection means 32b and 32d are integrally formed on the plate 32a on the side opposite the pinion 22a and the projections are respectively inserted into the first and second recesses 31b, 31b' of the core portion 31a. The first recess 31b extends between edge portions 31d and 31c, while the second recess extends between edge portions 31'c and 31'd. Clearances, as previously discussed, are disposed between the projection means 32b and 32d and the recesses 31b, 31b'. Thus, when the handle shaft 21 is rotated, the projection means 32b, 32d are engaged with the edges of the recesses 31b, 31b' and the plate 32a rotates with the handle shaft 21, after the relevant clearances are bridged.

Preferably the projection means 32b, 32d comprise projections formed as pairs of projection members with a slot 32c between the pair of projection members 32b and a slot 32c between the pair of projecion members 32d.

A first coil spring 33a and a second coil spring 33b are coiled around the core portion 31a and the projections 32b, 32d and the springs are serially disposed in the case 24. The outside diameter of both springs 33a, 33b is formed slightly larger than the inside diameter of the case 24 in the normal state of the springs. Thus, the outer surface of both springs 33a, 33b is frictionally engaged to the inside wall 24 of the case 24a when the springs are in their normal state.

Both end portions 133a, 133b, 233a, 233b of the springs 33a, 33b are bent inwardly to form tangs. One tang 133b of the first coil spring 33a is engaged with an edge portion 31d of the recess 31b and the other tang 133a of the spring 33a is hooked in the slot 32c of the plate 32a between the pair of projections 32b. Also, one tang 233a of the second coil spring 33b is engaged with the edge portion 31'c of the recess 31'b, and the other tang 233b is hooked in the slot 32e of the plate 32a between the pair of projections 32d.

This spring coupler is operated as follows.

In FIG. 5, in case the core 31a is rotated clockwise, as shown in FIG. 5, through the handle shaft 21, as shown by arrow B, tang 233a of the second coil spring 33b is engaged with the edge portion 31'c so that the second coil spring 33b is tightened and the frictional connection between the second coil spring and the case 24 is broken. Since the edge portion 31c of the recess 31b is engaged with one of the pairs of projection means 32b, the plate 32a is also rotated in the clockwise direction.

By the rotation of the plate 32a, the first coil spring 33a of which tang 133a is hooked in the slot 32c between the pair of projections 32b is also tightened and the frictional connection between the first coil spring 33a and the case 24 is broken so that the plate 32a rotates together with the handle shaft 21.

In case the core 31a is rotated in the counter-clockwise direction, as shown in FIG. 5, tang 133b of first coil spring 33a is engaged with the edge portion 31d so that the first coil spring 33a is tightened and the frictional connection between the first coil spring 33a and the case 24 is broken. Since the edge portion 31d of the recess 31b is engaged with one of the projections 32d, the plate 32a is also rotated in the counter-clockwise direction. By the rotation of the plate 32a, the second coil spring 33b of which tang 233b is hooked in the slot 32e is also tightened and the frictional connection between the second coil spring 33b and the case 24 is broken so that the plate 32a rotates together with the handle shaft 21.

On the contrary, if the plate 32a is rotated by the pinion 22a, since tang 133a of the first spring 33a and tang 233b of the second spring 33b are respectively hooked in the slots 32c, 33e of the plate 32a, one of the springs 32a, 32b is tightened but the other is expanded. Therefore, any force tending to rotate the plate 32a through the pinion 22a expands one of the springs 33a, 33b and the frictional connection to the case 24a is maintained. Any rotation of the plate 32 through the pinion 22a is thereby positively prevented.

What is claimed is:

1. A spring coupler brake comprising:

a housing;

a drive member rotatably mounted within said housing and including a drive shaft and a pair of flanges extending radially outward from said drive shaft, each of said flanges having a first inner surface defining a first recess between said flanges and a second inner surface defining a second recess between said flanges;

a driven member rotatably mounted within said housing and including a plate member having an aperture for mounting said driven member on said drive shaft, said plate member also having first and second projection means extending substantially parallel to said drive shaft and positioned within said first and second recesses respectively, each of said first and second projection means having a pair of elongated extensions defining a first and a second slot, respectively; and first and second spring members normally frictionally engaged to said housing, said first and second spring members having a cylindrical configuration and being serially aligned about said drive member and said driven member, and said first spring member having first means at opposite ends thereof for engaging said first inner surface of one of said flanges and said first slot, said second spring member having second means at opposite ends thereof for engaging said second inner surface of said one of said flanges and said second slot, thereby disengaging said first and second spring members from said housing to allow rotation of said driven member by said drive member in either direction while preventing essentially any movement of said drive member by rotation of said driven member.

2. The spring coupler brake of claim 1, wherein said opposite ends of said first and second spring members are bent inward to form said first and second engaging means.

* * * * *